L. COINCE-CHEVRET.
TELESCOPIC ROD WITH EXTENSIBLE SHEATH.
APPLICATION FILED APR. 11, 1919.

1,311,855. Patented July 29, 1919.

INVENTOR
LEONIE COINCE-CHEVRET
BY
ATTORNEYS

UNITED STATES PATENT OFFICE.

LÉONIE COINCE-CHEVRET, OF LE RAINCY, FRANCE.

TELESCOPIC ROD WITH EXTENSIBLE SHEATH.

1,311,855.          Specification of Letters Patent.      Patented July 29, 1919.

Application filed April 11, 1919. Serial No. 289,367.

*To all whom it may concern:*

Be it known that I, Mrs. ALBERT CHEVRET, born LÉONIE COINCE, a citizen of the Republic of France, and a resident of 33 Allée de Gagny, Le Raincy, Seine-et-Oise, France, have invented a new and useful Telescopic Rod with Extensible Sheath, of which the following is a specification.

This invention has for its object to provide a telescopic rod for wind-screens, curtains, etc., provided with a sheath of plaited or other extensible fabric which is capable of being extended and shortened at the same time as the rod in such a manner as to cover the said rod in all the positions of the latter.

This invention is illustrated by way of example in the accompanying drawings in which.

The telescopic rod constituted in the ordinary manner by a metal tube A, in each end of which there is adapted to slide a short rod-like member $a$ ending in a head $b$ with an eye for fixing purposes, is covered with a plaited fabric C attached at each end to the corresponding head $b$ by means of threads passing through the eye in the said head.

When the rod-like members $a$ are slidden in and out of the tube A for the purpose of shortening or lengthening the curtain rod, the plaited fabric C will become shortened or lengthened to an equal extent in such a manner that the rod will always remain covered throughout its length.

This arrangement has the advantage of enabling rods to be covered with sheaths of any desired colors, whereby original and novel decorative effects can be produced.

Figure 3:
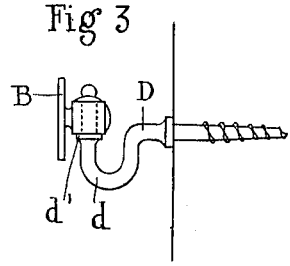
Fig. 3 illustrates a screw hook for supporting the rod.

In order to prevent drops of water due to the condensation of steam or vapor on the windows or walls to which the rods are fitted, from spoiling the sheaths with which the rods are covered, the screw hooks or nails D serving for fixing the rods, are formed with a bent portion $d$ (Fig. 3) so as to form a dripping place, the arrangement being such that the drops due to the aforesaid condensation are arrested by the said bent portion and drop off before reaching the covering thereof. The screw hooks or nails may be formed with a shoulder $d^1$ or other bearing surface for supporting the head of the rod.

Figure 1:
Figure 1 is a longitudinal section of a portion of the rod.
Figure 2:
Fig. 2 is an outside view of the rod taken at right angles to the section shown in Fig. 1.
Figure 4:
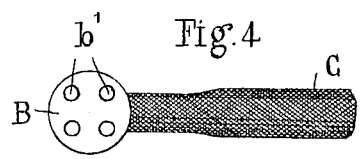
Figs. 4 and 5 are views at right angles to each other of a modified construction of the rod.
Figure 5:
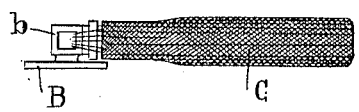

In the modification shown in Figs. 4 and 5, the heads of the rod are formed with disks B arranged parallel to the axis of the rod. These disks are perforated with a certain number of holes $b^1$ to allow of sewing thereon a knot or bow of ribbon of the same color as the plaited sheath, or of a color harmonizing therewith.

It is to be understood that this invention is not limited to the forms and constructional details which are given here solely by way of example and which may be varied without departing from the nature of the invention.

Further, the plaited sheaths may be of any desired color and may be made of any suitable material (such as silk, wool, thread, cotton, ramie, rafia, jute, etc.).

What I claim is:

1. A telescopic rod for wind-screens, curtains, etc., covered by a sheath of plaited or other extensible fabric which can extend or contract at the same time as the rod, in such a manner as to cover the said rod throughout in all the positions of the latter.

2. The combination with a telescopic rod comprising a tubulaar body and end rod extensions sliding in said tubular body, of an extensible fabric sheath incasing the tubular body of the rod, and means for fastening the ends of the fabric sheath to the heads of the rod extensions whereby the sheath is automatically elongated when the rod extensions are pulled out, substantially as described.

In testimony whereof I have signed my name to this specification.

LÉONIE COINCE-CHEVRET.

Witnesses:
     CHARLES DOUY,
     N. DEFÉVREMONT.